United States Patent [19]

Bartley

[11] Patent Number: 4,835,878
[45] Date of Patent: Jun. 6, 1989

[54] STABLE MEASURING PLATFORM

[75] Inventor: Donald L. Bartley, Willoughby, Ohio

[73] Assignee: Kennametal Inc., Latrobe, Pa.

[21] Appl. No.: 183,942

[22] Filed: Apr. 20, 1988

[51] Int. Cl.$^4$ .......................... B27G 23/00; G01B 5/00
[52] U.S. Cl. ...................................................... 33/637
[58] Field of Search ................ 33/626, 632, 633, 634, 33/636, 637

[56] References Cited

U.S. PATENT DOCUMENTS

| | | | |
|---|---|---|---|
| 1,474,992 | 11/1923 | Zuber | 33/637 X |
| 2,341,466 | 2/1944 | Nardi | 33/637 |
| 3,546,781 | 12/1970 | Cox et al. | |
| 3,564,721 | 2/1971 | Wilson | |
| 3,606,550 | 9/1971 | Proksa | 33/637 X |
| 4,222,172 | 9/1980 | Mason | |
| 4,596,076 | 6/1986 | Sigg | |

Primary Examiner—Harry N. Haroian
Attorney, Agent, or Firm—Thomas R. Trempus

[57] ABSTRACT

A stable measuring platform for aligning the position of a cutting insert mounted on an exterior surface of a boring apparatus is disclosed. A gauge body is utilized having an internal support means adapted for insertion into the bore of the boring apparatus, and external support for stabilizing the boring apparatus along its exterior surface. A dial indicator for measuring the relative position of the cutting inserts is also mounted on the gauge body, and adapted to accurately measure the location of the cutting inserts relative to the gauge body while the gauge body is affixed to the boring apparatus. The device is specifically adapted for one-hand operation, and is entirely self supporting on the workpiece, leaving the operator's hands free during the alignment operation.

19 Claims, 2 Drawing Sheets

STABLE MEASURING PLATFORM

FIELD OF THE INVENTION

The present invention relates to a precise calibrating device for a cutting tool utilizing cutting inserts. More specifically, the present invention relates to an apparatus which may be temporarily affixed to the cutting tool for calibration, and may be easily inserted and removed from the cutting tool with one hand.

BACKGROUND ART

A number of devices have been proposed for the aligning of cutting-type tools or for precise measurement of a particular dimension of a workpiece. The most common of the devices currently in use for fulfilling the function of the stable measuring platform is similar to that disclosed in Sigg, U.S. Pat. No. 4,596,076. A three point contact with the exterior of the workpiece is shown, however, the Sigg device is designed merely for the measurement of the diameter of the piece within the grasp of the device. A modified Sigg device has a dial indicator positioned on one of the support arms, angled so that a cutting insert position may be accurately located. This modified device, however, is ungainly and has poor balance, requiring the operator of the cutting machine to hold the measuring device while aligning the cutting insert. This allows for a greater degree of inaccuracy, because of movement by the user during measurement.

Other devices are adapted to be clamped to a surface near the cutting edges to be aligned, as disclosed in Cox, et. al., U.S. Pat. No. 3,546,781. Such a device has a lesser degree of accuracy, because inaccuracy in the measurement is heightened by inaccurate placement of the measuring device on the cutting tool or some exterior surface. Additionally, if the measuring device is mounted on a surface that is not the actual cutting tool, such as the body of the cutting machine, inaccuracy is increased because of play or deviation in the mounting of the cutting tool within the body of the cutting machine.

Portability and ease of use are also important considerations. A measuring device should be capable of being used on the cutting machine itself and not require removal of the cutting tool for calibration. Similarly, the device, even though portable, should have a high degree of accuracy based on careful mounting of the measuring device on the cutting tool. Mason, U.S. Pat. No. 4,222,172, and Wilson, U.S. Pat. No. 3,564,721, disclose devices that have little portability and capability for accurate placement of the workpiece within the measuring chamber.

DISCLOSURE OF INVENTION

The present invention was developed to aid in the calibration and adjustment to a cutting or boring tool which utilizes cutting inserts mounted on a spinning body. This cutting tool is used, for example, in the manufacture of valve seats in the cylinder heads of automobile and other internal combustion engines. The cutting tool has a generally cylindrical body with the cutting inserts mounted on the exterior, adapted to gouge out a concave depression in the metal of the head surface. The cutting tool is generally adapted to have a reamer inserted into its center, which is adapted to cut a bore for the stem of the valves. The reamer rod is removable from the cutting tool, leaving a cylindrical bore at its center point. It is this cylindrical bore that allows the insertion of the stable measuring platform, which is additionally stabilized by a three point external support means.

A stable measuring platform for aligning the position of a cutting insert mounted on an exterior surface of a boring apparatus is disclosed which is comprised of a gauge body with an internal support means adapted for insertion into the bore of the boring apparatus. The platform additionally has an external support means for stabilizing the boring apparatus along its exterior surface. A means for measuring the relative position of the cutting inserts is also mounted on the gauge body, and adapted to accurately measure the location of the cutting inserts relative to the gauge body while the gauge body is affixed to the boring apparatus.

These and other advantages and features of the present invention will be more fully understood on reference to the presently preferred embodiments thereof and to the appended drawings.

BEST MODE OF PRACTICE OF THE INVENTION

A stable measuring platform is provided for aligning the position of a cutting insert mounted on an exterior surface of a boring apparatus. The device is comprised of a gauge body which utilizes two means of support for temporary mounting on the boring device. The first is internal support means, preferably an expanding mandrel, adapted for use entirely within a cylindrical sleeve. The mandrel is mounted within the gauge body for insertion into the bore of the boring apparatus and maintains the gauge body in a fixed position relative to the boring apparatus. The internal support has a three point contact with the inner diameter of the bore in the boring apparatus.

The second support means is the external support, which has a three point contact with the exterior of the boring apparatus. The external support is comprised of two angled blocks forming a V-shaped cradle, and a pivotally mounted pinch roller. The pinch roller is resiliently biased to enhance the three point contact between the V-shaped cradle and the pinch roller. The external support means is mounted on the gauge body and engages the exterior of the boring apparatus to retain the gauge body in a fixed position relative to the boring apparatus. In operation, the internal and external supports allow for the rotation of the stable measuring platform about the internal support when inserted into the boring apparatus. A handle is provided, which, when depressed, will release the internal and external supports. When released, the handle engages the internal and external supports in order to mount the invention on the boring apparatus.

A measuring means, preferably a dial indicator, is provided, mounted on the gauge body, wherein the platform is adapted to accurately measure the location of the cutting inserts relative to the gauge body while the gauge body is affixed to the boring apparatus.

A registration surface is mounted on the gauge body so that an accurate placement on the boring apparatus is visibly and accurately ascertainable.

Figure 1:
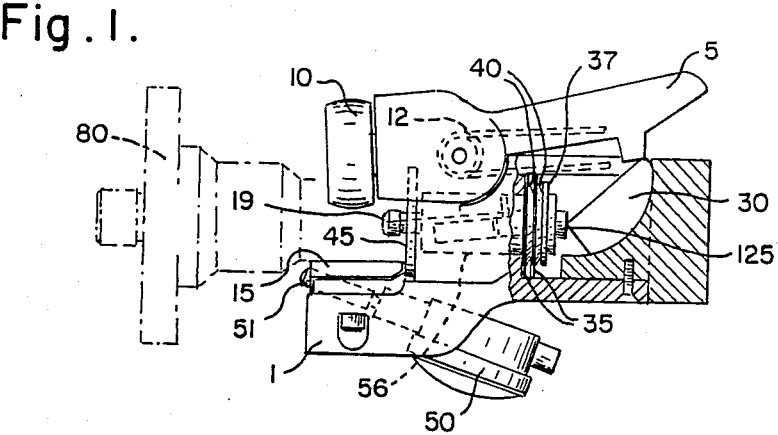
FIG. 1 is a side elevational view of the invention in partial cross section.

Referring to FIG. 1, a gauge body 1 is shown, having a handle 5 pivotably connected thereto. Boring tool 80 is shown diagrammatically for illustrative purposes of its position only. A dial indicator 50 is mounted within the gauge body 1, and is specially positioned to provide an alignment guide for the placement of a cutting insert 75 (see FIG. 5) on boring tool 80.

Handle 5 is shown with pinch roller 10 attached, forming one of the three points of exterior contact with the boring tool 80. V-blocks 15 (see also FIG. 4), mounted on gauge body 1, provide the remaining two points of exterior contact with the boring tool 80. A registration surface 45 is precisely ground and placed on gauge body 1 so that a workpiece firmly abutting the registration surface is properly positioned for the accurate measurement of the boring tool's insert placement.

An expanding mandrel 19 is provided for the internal support of the boring tool 80. A more detailed description follows with FIGS. 2 and 3. The mandrel 19 is slidably contained in cylindrical sleeve or bore 56, and activated by depression of handle 5 which engages push block 30, which in turn engages rod 125. The entire mandrel 19 is resiliently urged away from the workpiece by a plurality of wave washers 40 interspersed between flat washers 35, so that when engaged with boring tool 80, and handle 5 is released, both the mandrel 19 and engaged boring tool 80 are drawn tightly up against registration surface 45. The flat washers 35 and wave washers 40 are retained around the circumference of the mandrel 19 by retaining washer 37 which is locked into a groove 38 cut into the mandrel body 101 (see FIG. 2).

Figure 2:
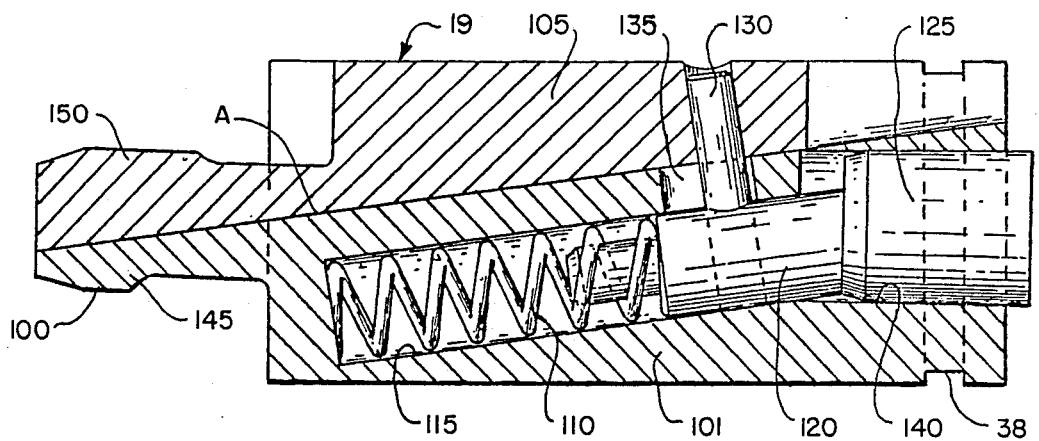
FIG. 2 is a longitudinal sectional view partly in elevation of the expanding mandrel utilized in the invention.

Referring to FIG. 2, the mandrel 19 is more explicitly disclosed, having a body member 101 which contains a canted cylindrical bore 115 adapated to contain resilient means 110, which is preferably a spring. The body member 101 also has a rod bore 140 which extends from the rear end of the body member to meet the canted bore 115 at an interior point. The body member 101 is circular in cross section, allowing the entire mandrel 19 to be rotated within a cylindrical sleeve or bore while engaged with a workpiece.

The resilient means 110 engages a plunger 120 within canted bore 115. A rod 125 is slidingly inserted into rod bore 140, which engages the plunger 120. Rod 125 and plunger 120 combine to form a shaft means by which external force is exerted on the resilient means 110.

Wedge 105 is slidably engaged to body member 101 along a curved surface A which is concave on body member 101 and convex on wedge 105. The wedge has a dowel rod 130 extending outwardly therefrom which passes through a slotted hole 135 in the surface A of the body member 101. The dowel 130 is affixed to plunger 120, and is adapted to slide wedge 105 with the movement of plunger 120 and rod 125 against resilient means 110. A groove 38 is provided in the rear portion of the body member 101 for engagement to a retaining washer 37 (see FIG. 1).

Figure 3:
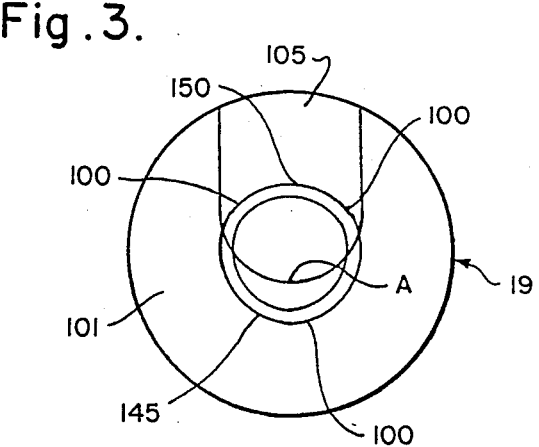
FIG. 3 is a front elevational view of the expanding mandrel utilized in the invention, viewed from the left of FIG. 2.

Referring to FIG. 3, the body member 101 is shown having a generally parabolic outer surface 145 and a concave engaging surface A. The wedge 105 is shown having a generally elliptical surface 150. Approximate points of contact 100 are shown on the two members. The actual placement of the points of contact on wedge 105 is controlled by varing the oblate character of the ellipsoid shape.

In the operation of the mandrel, the rod 125 is pushed inwardly by an external force (not shown), which forces plunger 120 against resilient means 110. The plunger moves downwardly through canted bore 115, while wedge 105 moves in a parallel manner along surface A, joined to plunger 120 by dowel 130. This reduces the diameter of the working end of the mandrel and allows the insertion of the working end into a cylindrical boring tool 80 or other workpiece inside diameter. The pressure on rod 125 is then released, and the resilient means 110 expands, forcing plunger 120, dowel 130 and wedge 105 upwardly and to the right (as seen in FIG. 2) along the canted bore 115, slot 135 and surface A, respectively. The wedge 105 and body member 101 come into contact with the boring tool inside diamter at points of contact 100. The mandrel is held in place by the force of resilient means 110.

Due to the cylindrical nature of the entire mechanism, this device is suited for use entirely contained within cylindrical sleeve or bore 56. It may be extended or retracted by outside force provided by push block 30 and handle 5 as necessary. In addition, due to the self contained nature of the device, i.e., no structure of the mandrel extends beyond its outer cross-sectional circumference, and the symmetry of rod bore 140 and rod 125, the entire mandrel or the boring tool 80 may be rotated freely within the encompassing cylindrical sleeve 56.

Figure 4:
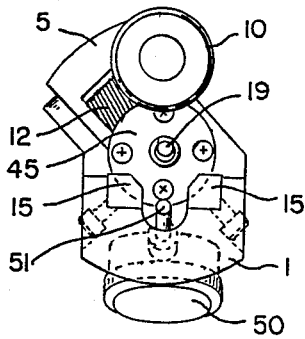
FIG. 4 is an end elevation of the invention from the left of FIG. 1.

Referring to FIG. 4, the handle 5 having pinch roller 10 is shown being pivotably attached to gauge body 1, and being urged in the engaged position by spring 12. Registration plate 45 surrounds the end of the mandrel 19. V-blocks 15 are clearly shown, and the three point contact of pinch roller 10 and V-blocks 15 is evident. Dial indicator 50 is shown within gauge body 1, and engaging surface 51 of the dial indicator is positioned for alingment of the cutting insert 75.

Figure 5:
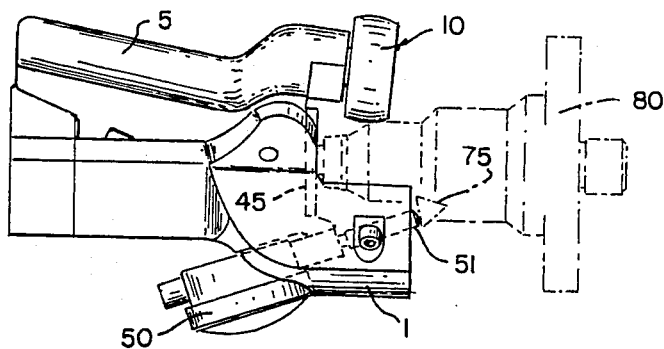
FIG. 5 is another side elevation of the invention.

Referring to FIG. 5, the boring tool 80 is clearly shown engaged with the measuring platform. Cutting insert 75 is shown in relation to engaging surface 51 of dial indicator 50.

In operation, the handle 5 is depressed, which both extends wedge 105 of mandrel 19, raises pinch roller 10 away from V-blocks 15, and forces the mandrel 19 outwardly from the gauge body, compressing wave washers 40 between flat washers 35. The mandrel 19 is inserted into the boring tool 80 having inserts 75, and the handle 5 is released. The canted spring 110 of mandrel 19 urges the wedge 105 of mandrel 10 against the interior diameter (not shown) of the boring tool 80, forming a three point internal support of the boring tool 80. The mandrel 19, now engaged to the boring tool 80 along the inside diameter of the boring tool, is drawn tightly up against the registration surface 45 by the resilient action of wave washers 40 interspersed between flat washers 35. Spring 12 urges the pinch roller 10 against the exterior of the boring tool 80, which is also supported by the V-blocks 15, forming a three point exterior support. Pinch roller 10 is shaped and canted in such a manner so as to urge the boring tool 80 against the registration surface 45. The platform is now locked into place and the cutting insert 75 can be aligned utilizing dial indicator 50 to the correct position.

The mandrel 19 is rotatably inserted within sleeve or bore 56, and is restrained from overextension within the gauge body by push block 30. Additionally, wave washers 40 and flat washers 35 prevent overextension and removal of the mandrel 19 from the front of the gauge body 1. The washers 40 and 35 are retained in place by restraining washer 37 positioned in groove 38, so that while lateral movement is restrained to a fixed range, rotational movement of the mandrel 19 relative to the gauge body 1 is free over an entire 360°. The platform is designed so that the entire platform can be rotated about the cylindrical mandrel 19 within cylindrical sleeve or bore 56, in order to sweep the dial indicator engaging surface 51 over the high point of the cutting insert 75 for maximum accuracy.

To remove the platform, the handle 5 is depressed, narrowing the diameter of mandrel 19, raising pinch roller 10, and the platform is removed.

While I have described a present preferred embodiment of the invention, it is to be distinctly understood that the invention is not limited thereto but may be otherwise embodied and practiced within the scope of the following claims.

I claim:

1. A stable measuring platform for aligning the position of a cutting insert mounted on an exterior surface of a boring apparatus comprising:
   (a) a gauge body;
   (b) internal support means within the gauge body for insertion into a bore of the boring apparatus and for maintaining the gauge body in a fixed position relative to the boring apparatus;
   (c) external support means mounted on the gauge body engaging the exterior of the boring apparatus for retaining the gauge body in a fixed position relative to the boring apparatus; and
   (d) measuring means mounted on the gauge body; wherein the platform is adapted to accurately measure the location of the cutting insert relative to the gauge body while the gauge body is affixed to the boring apparatus.

2. A stable measuring platform as described in claim 1, wherein the internal and external support means allows for the rotation of the stable measuring platform about the internal support means when inserted into the boring apparatus.

3. A stable measuring platform as described in claim 1, wherein the internal support means has a three point contact with the inner diameter of the bore in the boring apparatus.

4. A stable measuring platform as described in claim 1, wherein the external support means has a three point contact with the exterior of the boring apparatus, the external support comprising two angled blocks forming a V-shaped cradle, and a pivotally mounted pinch roller.

5. A stable measuring platform as described in claim 4, wherein the pinch roller is resiliently biased to enhance the three point contact between the V-shaped cradle and the pinch roller.

6. A stable measuring platform as described in claim 1, further comprising handle means, which when depressed, will release the internal and external supports.

7. A stable measuring platform as described in claim 1, further comprising a registration surface mounted so that an accurate placement on the boring apparatus is visibly ascertainable.

8. A stable measuring platform as described in claim 1, wherein the measuring means is a dial indicator.

9. A stable measuring platform as described in claim 1, wherein the internal support is an expanding mandrel adapted for use entirely within a cylindrical sleeve.

10. A stable measuring platform as described in claim 9 wherein the expanding mandrel comprises:
    (a) a body member having a working end which engages an inner diameter of a workpiece at a single point;
    (b) resilient means mounted within the body member;
    (c) a single wedge member slidably engaging the body member having a working end which engages the inner diameter of the workpiece at two points, the wedge engaging and being biased by the resilient means in a direction opposite the working end of the body member;
    (d) shaft means for compressing the resilient means and sliding the wedge towards the working end of the body member;
    wherein the wedge and body member are forced against the inner diameter of the workpiece by the resilient means, forming a three point contact, and are released by the application of external pressure on the shaft means.

11. A stable measuring platform as described in claim 10, wherein the expanding mandrel has a body member comprising a concave inner surface engaging the wedge member.

12. A stable measuring platform as described in claim 10, wherein the mandrel has a body member which is generally parabolic in cross-sectional outer surface.

13. A stable measuring platform as described in claim 10, wherein the expanding mandrel has a wedge and resilient means connected by a dowel.

14. A stable measuring platform as described in claim 10, wherein the expanding mandrel has a body member having a hole in the inner surface sized and shaped to permit the passage of the dowel connecting the resilient means and the wedge.

15. A stable measuring platform as described in claim 10, wherein the expanding mandrel utilizes a spring as the resilient means.

16. A stable measuring platform as described in claim 10, wherin the expanding mandrel has a body member having a cylindrical bore adapted to contain the resilient means.

17. A stable measuring platform as described in claim 10, wherein the expanding mandrel has a wedge member which is generally elliptical in cross section.

18. A stable measuring platform as described in claim 10, wherein the expanding mandrel has a shaft means further comprising a rod and a plunger having one end abutting the rod and another end engaging the resilient means, wherein the rod conveys an external force to the plunger which compresses the resilient means.

19. A stable measuring platform as described in claim 10, wherein the expanding mandrel may be rotated within the cylindrical sleeve while engaging the workpiece.

* * * * *